United States Patent [19]
Takeuchi et al.

[11] Patent Number: 5,338,063
[45] Date of Patent: Aug. 16, 1994

[54] VEHICLE SAFETY DEVICE CONTROL APPARATUS

[75] Inventors: Kunihiro Takeuchi; Hideyuki Kaneko; Hideki Ishizuka, all of Higashimatsuyama, Japan

[73] Assignee: Airbag Systems Company, Ltd., Gumma, Japan

[21] Appl. No.: 26,419

[22] Filed: Mar. 4, 1993

[30] Foreign Application Priority Data

Mar. 6, 1992 [JP] Japan ................ 4-082913

[51] Int. Cl.$^5$ .............. B60R 21/32; B60R 22/46
[52] U.S. Cl. .................. 280/735; 280/806; 180/268; 307/10.1
[58] Field of Search ......... 280/735, 734, 806, 728 R; 180/268; 307/10.1; 364/424.05

[56] References Cited
U.S. PATENT DOCUMENTS

| | | | |
|---|---|---|---|
| 4,620,721 | 11/1986 | Scholz et al. | 280/735 |
| 4,804,859 | 2/1989 | Swart | 280/735 X |
| 4,984,651 | 1/1991 | Grosch et al. | 280/735 X |
| 5,081,587 | 1/1992 | Okano | 280/735 X |

FOREIGN PATENT DOCUMENTS

| | | | |
|---|---|---|---|
| 0063954 | 3/1990 | Japan | 280/806 |
| 4287746 | 10/1992 | Japan | 280/735 |
| 9003902 | 4/1990 | World Int. Prop. O. | 280/806 |

*Primary Examiner*—Margaret A. Focarino
*Assistant Examiner*—Peter English
*Attorney, Agent, or Firm*—Pollock, Vande Sande & Priddy

[57] ABSTRACT

In a control apparatus that activates a preloader device and after a timing delay an air bag device when a vehicle collision is detected, the apparatus has a detector for detecting whether or not a seatbelt is buckled, and a timing signal for activating the air bag device is generated without the timing delay if the seatbelt is not buckled, whereby the air bag device can be activated with a timing appropriate to the condition present at the time.

7 Claims, 4 Drawing Sheets

VEHICLE SAFETY DEVICE CONTROL APPARATUS

BACKGROUND OF THE INVENTION

1. Field of the Invention

The present invention relates to a vehicle safety device control apparatus, and more particularly to an apparatus for controlling a plurality of vehicle safety devices.

2. Prior Art

Air bags and preloaders are representative examples of the various vehicle safety devices that have been developed to protect passengers from the shock of vehicle collisions. These devices can be used independently. However, arrangements are known in which the safety of passengers involved in a vehicle collision is further ensured by using two types of safety devices together, for example by providing the driver's seat with an air bag device and a preloader device that are both activated when it is sensed that the vehicle is in a collision.

However, such an arrangement in which multiple vehicle safety devices of different types are used selectively together gives rise to the following problems. Normally the optimum timing used to trigger an air bag device is determined on the basis of the results of collision tests in which passengers are not restrained. When a preloader device is being used together with an air bag device, for example, a passenger is restrained by the preloader device when a collision occurs. As a result, displacement of the passenger's head is delayed compared to when a passenger is not thus restrained. This gives rise to a clear risk that the air bag will have started to deflate by the time the passenger's head contacts the air bag.

It is possible that this problem could be resolved by employing a multi-point sensor system, for example, but this is disadvantageous owing to the fact that costs would be increased by the need for many more sensors required together with the need to be able to alter the characteristics of the sensors.

SUMMARY OF THE INVENTION

An object of the present invention is therefore to provide an improved control apparatus for controlling a plurality of vehicle safety devices.

Another object of the present invention is to provide a control apparatus for controlling multiple vehicle safety devices of different types that in accordance with the utilization status of the devices can activate the devices with a timing that is more appropriate for passenger safety.

In accordance with the present invention, the above objects are attained by a control apparatus that is provided with sensor means for detecting vehicle acceleration and integrating means for carrying out integration processing of output from the sensor means, and in accordance with the output state of the integrating means controls the activation timing of at least an air bag device, the control apparatus comprising detecting means for detecting whether a seatbelt is or is not buckled, determining means that in response to the detecting means and integrating means determines activation timing for the air bag device according to whether or not a seatbelt is buckled, and signal output means that outputs an electrical signal to activate the air bag means at an activation timing determined by the determining means.

Thus, the detecting means is used to detect whether a passenger's seatbelt has been buckled or not, and in response to the detection output indicating that the seatbelt is buckled or that it is not, a more appropriate air bag device activation timing is determined by the determining means. In accordance with the activation timing thus determined, the signal output means outputs an electrical signal to activate the air bag device, whereby the air bag device functions at a timing that is based on whether the seatbelt is being used or not.

The invention will be better understood and other objects and advantages thereof will be more apparent from the following detailed description of preferred embodiments with reference to the drawings.

DETAILED DESCRIPTION OF THE PREFERRED EMBODIMENTS

Figure 1:
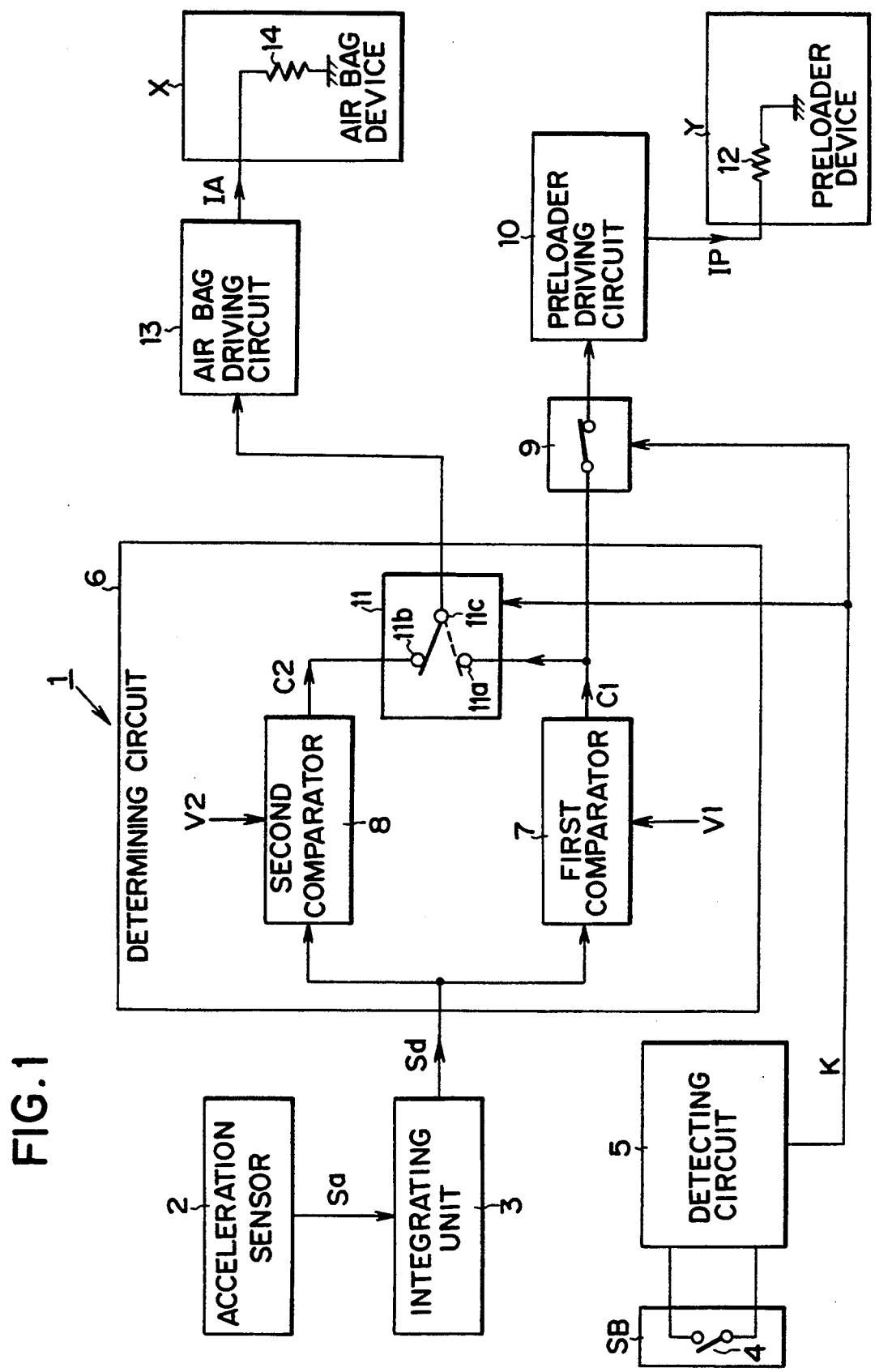
FIG. 1 is a schematic diagram of the arrangement of an embodiment of a vehicle safety device control apparatus according to the present invention.

FIG. 1 is a schematic diagram of an embodiment of an apparatus for controlling vehicle safety devices according to the present invention. In accordance with this embodiment, a control apparatus 1 controls the activation of two safety devices, an air bag device X and a preloader device Y, provided in a vehicle, using a control arrangement that permits activation of just the air bag device X, or of both the air bag device X and the preloader device Y.

The control apparatus 1 is equipped with a known acceleration sensor 2 which is affixed at a suitable location in the vehicle and outputs an acceleration signal Sa that indicates the acceleration of the vehicle. When the acceleration signal Sa exceeds a certain preset level it is subjected to integration processing by an integrating unit 3, which then outputs an integration output signal Sd that indicates the changing status of vehicle speed.

Figure 2:
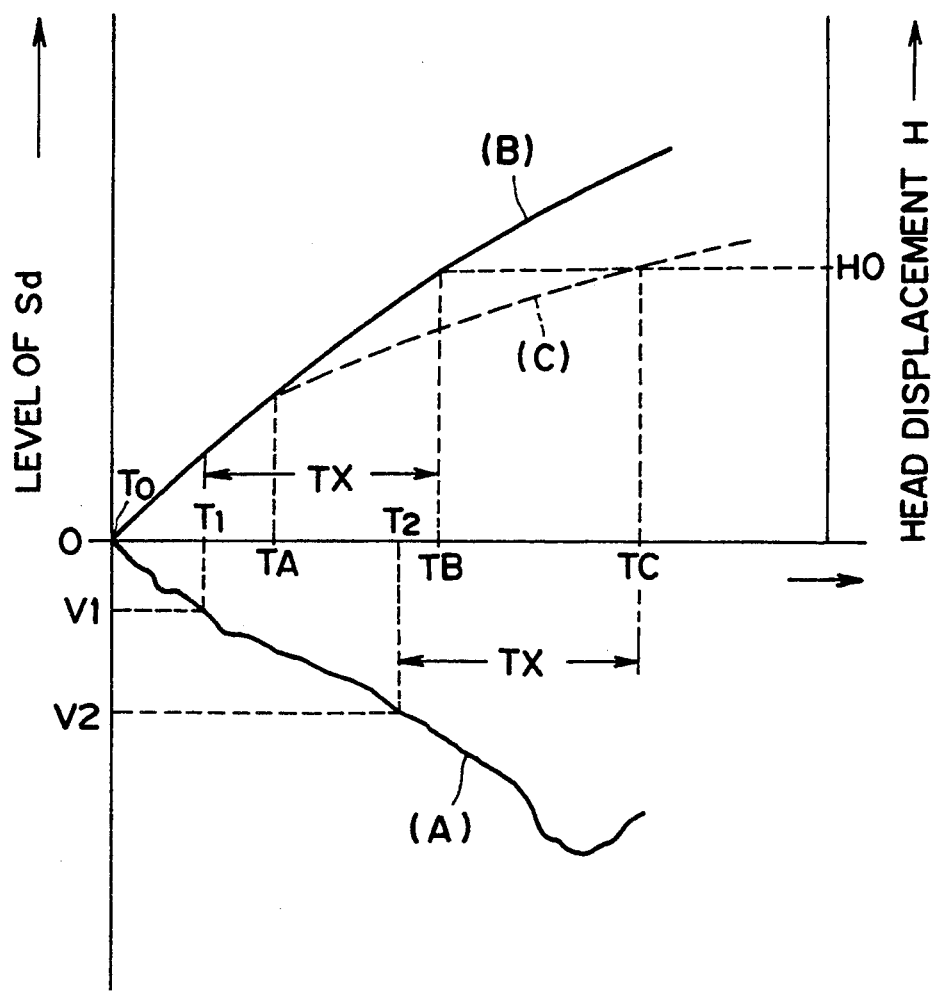
FIG. 2 is a graph for illustrating the operation of the vehicle safety device control apparatus of FIG. 1.

FIG. 2 shows an example of a plot of how the integration output signal Sd changes when the vehicle is in a collision. Specifically, in FIG. 2, curve (A) is a plot of changes in the level of the integration output signal Sd following the commencement of the acceleration signal Sa integration triggered by the acceleration signal Sa exceeding a predetermined level at time T0. As a known arrangement is used for the integrating unit 3 that has the integrating capability for integrating the vehicle acceleration signal to detect when the vehicle is in a collision, details thereof are omitted.

With reference again to FIG. 1, a switch 4 is provided in the buckle of a seatbelt SB in an arrangement whereby the switch 4 is closed when the seatbelt SB is buckled. The seat belt switch 4 is connected to a detecting circuit 5 that outputs a detection signal K that is set high, or low, depending on whether the seat belt switch 4 is open or closed. In accordance with the arrangement of this embodiment, the detection signal K goes high when the seat belt switch 4 is closed by the seatbelt being buckled. The detection signal K and integration output signal Sd are input to a determining circuit 6 to determine the activation timing of the air bag device X and preloader device Y.

The determining circuit 6 is provided with a first comparator 7 and a second comparator 8. The integration output signal Sd is input to this first comparator 7 and second comparator 8. The first comparator 7 compares the level of the integration output signal Sd with the level of a first reference voltage V1 (FIG. 2), and, if the level of the integration output signal Sd is lower than that of the first reference voltage V1, outputs a first discrimination output C1 that goes high. The second comparator 8 compares the level of the integration output signal Sd with the level of a second reference voltage V2 (FIG. 2) and, if the level of the integration output signal Sd is lower than that of a second reference voltage V2 (FIG. 2), outputs a second discrimination output C2 that goes high.

From FIG. 2 it can be seen that the first reference voltage V1 is set higher than the second reference voltage V2. Therefore, in the example of FIG. 2, when the vehicle suffers a collision the state of the first discrimination output C1 goes from low to high at T1, following which the second discrimination output C2 goes from low to high at T2.

The first discrimination output C1 is applied to an input terminal 11a of a selecting switch 11 which is controlled in accordance with the detection signal K, and the second discrimination output C2 is applied to the other input terminal 11b of the selecting switch 11. The output terminal 11c of the selecting switch 11 is connected to the input of an air bag driving circuit 13. The selecting switch 11 is controlled so that when the detection signal K is high the selecting switch 11 assumes the state indicated by a solid line and, conversely, when the detection signal K is low the selecting switch 11 assumes the state indicated by a broken line. The selecting switch 11 therefore selects the second discrimination output C2 when the seatbelt is buckled, and the first discrimination output C1 when the seatbelt is not buckled, whereby whichever of the outputs is selected is input to the air bag driving circuit 13. That is, the determining circuit 6 is equipped with the function of discriminating between whether or not the level of the integration output signal Sd from the integrating unit 3 has attained the prescribed level established in accordance with the detection signal K from the detecting circuit 5, thereby permitting the activation timing of the vehicle safety devices to be optimized according to whether the seatbelt has been buckled or not.

The air bag driving circuit 13 is arranged so that it responds to the input signal from the selecting switch 11 going from low to high and supplies an air bag ignition current IA to an ignition squib 14 of the air bag device X.

The first discrimination output C1 is input to a preloader driving circuit 10 via a switch 9 that is controlled in accordance with the detection signal K. The switch 9 is controlled so that it is only closed when the detection signal K is high, meaning only when the seatbelt is buckled. Thus, when the seatbelt is buckled the first discrimination output C1 is input to the preloader driving circuit 10 via the switch 9. The preloader driving circuit 10 is arranged so that it responds to the input of the first discrimination output C1 going from low to high and supplies a preloader ignition current IP to an ignition squib 12 of the preloader device Y. As a result, if the level of the integration output signal Sd has become lower than that of the first reference voltage V1, first the preloader device Y is triggered, restraining the passenger.

In accordance with this arrangement, if the passenger's seatbelt is buckled the seat belt switch 4 will be closed, so the first discrimination output C1 will be input to the preloader driving circuit 10 and the second discrimination output C2 will be input to the air bag driving circuit 13. When the integration output signal Sd registers a negative change as a result of a vehicle collision, the preloader device Y is activated at T1, and after a short pause this is followed by the activation of the air bag device X at T2.

Details of the operation of the devices X and Y will now be explained with reference to FIG. 2. The solid line (B) in FIG. 2 shows the increase in head displacement H of a passenger who is not restrained when the vehicle is in a collision. However, by activating the preloader device Y at time T1 so that after a slight time delay TA the body of the passenger is held in the seat by the seatbelt, the subsequent increase in head displacement H is moderated, as shown by the broken line (C). Moreover, at T2 the air bag device X is activated and, after the elapse of a prescribed time period TX, at TC the air bag will have become sufficiently inflated. Time TC is at a point HO at which the head of the passenger contacts the inflated air bag.

It takes more time for the passenger's head to contact the air bag when the passenger is restrained by the preloader device Y than when the passenger is not restrained by the seatbelt. The passenger can be effectively protected from the secondary shocks of a collision by setting the second reference voltage V2 (that is, T2 timing) at a level that, based on experiments, is appropriately lower than V1. It is preferable for the preloader device Y to be activated at the same time that a collision is detected, and as such the level of the first reference voltage V1 is referred to as the level for detecting vehicle collision.

On the other hand, if the seatbelt is not buckled, the seat belt switch 4 will remain open and, therefore, the switch 9 will be open and the preloader device Y will not be activated. However, selecting switch 11 will be in the state indicated by the broken line, thereby allowing the first discrimination output C1 to be input to the air bag driving circuit 13. As a result, as will be understood from FIG. 2, when it is determined that the vehicle is in a collision, the air bag device X will be activated at T1 and, after the elapse of time period TX, at TB the air bag will be sufficiently inflated. This enables the air bag device X to effectively protect the passenger's head which, as a result of the passenger not being restrained by a seatbelt, is subjected to the major displacement indicated by the solid line (B).

As the activation timing of the air bag device is thus appropriately determined in accordance with whether the seatbelt is buckled or not, even when a seatbelt is provided together with an air bag device, the air bag device can be activated with a timing that is appropriate to the conditions present at the time.

While the above embodiment of the invention has been described with reference to an arrangement in which discrete circuits are used, the same effect can be achieved by using an appropriate control program executed by a microcomputer.

Figure 3:
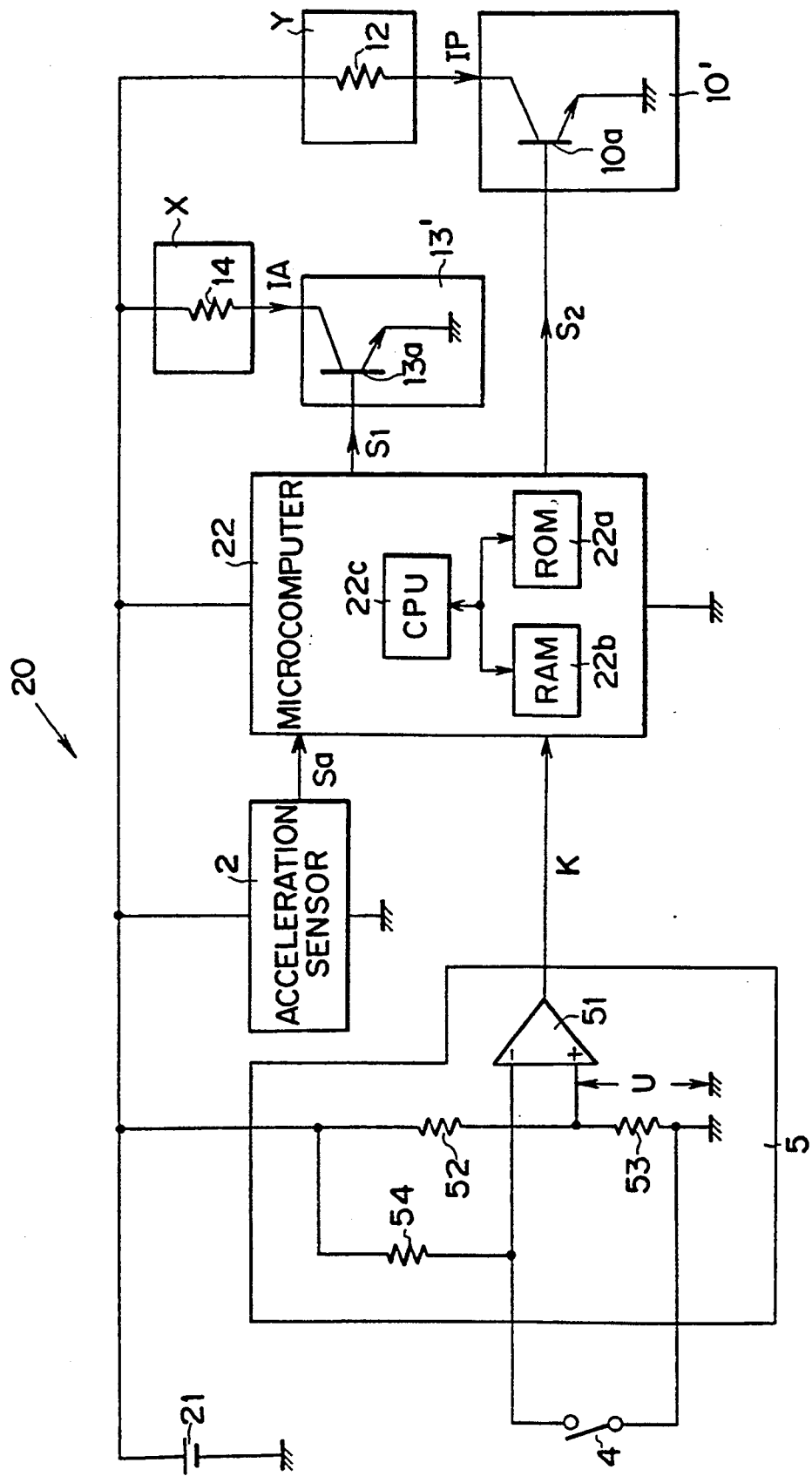
FIG. 3 is a circuit diagram of another embodiment of a vehicle safety device control apparatus according to the present invention.

FIG. 3 shows another embodiment of the control apparatus of the invention. In accordance with the arrangement of this embodiment, a control apparatus 20 uses a microcomputer. With reference to FIG. 3, elements corresponding to those shown in FIG. 1 have been given the same reference numerals, and the description thereof is omitted. A microcomputer 22 operated by electrical power supplied by a battery 21 includes a read-only memory (ROM) 22a, a random-access memory (RAM) 22b and a central processing unit (CPU) 22c arranged in a known configuration. The ROM 22a contains a control program that, in response to acceleration signal Sa and detection signal K, outputs a first control signal S1 that controls the activation of the air bag device X, and a second control signal S2 that controls the activation of the preloader device Y.

The detecting circuit 5 is provided with a voltage comparator 51. Applied to the positive input terminal of the voltage comparator 51 is a constant voltage U obtained by using a resistance 52 and resistance 53 to divide the terminal voltage of the battery 21. Connected to the negative terminal of the voltage comparator 51 are the other terminal of a resistance 54 that is connected to the positive terminal of the battery 21, and a terminal of the seat belt switch 4, the other terminal of which is grounded, forming an arrangement whereby operating the seat belt switch 4 causes the level at the negative input terminal to assume the level of the positive pole of the battery 21, or ground level. Therefore, when the seat belt switch 4 is closed the detection signal K goes high, and when the seat belt switch 4 is open the detection signal K goes low. The circuit arrangement of the detecting circuit 5 shown in FIG. 3 may be used without modification as the detecting circuit 5 of FIG. 1.

Figure 4:
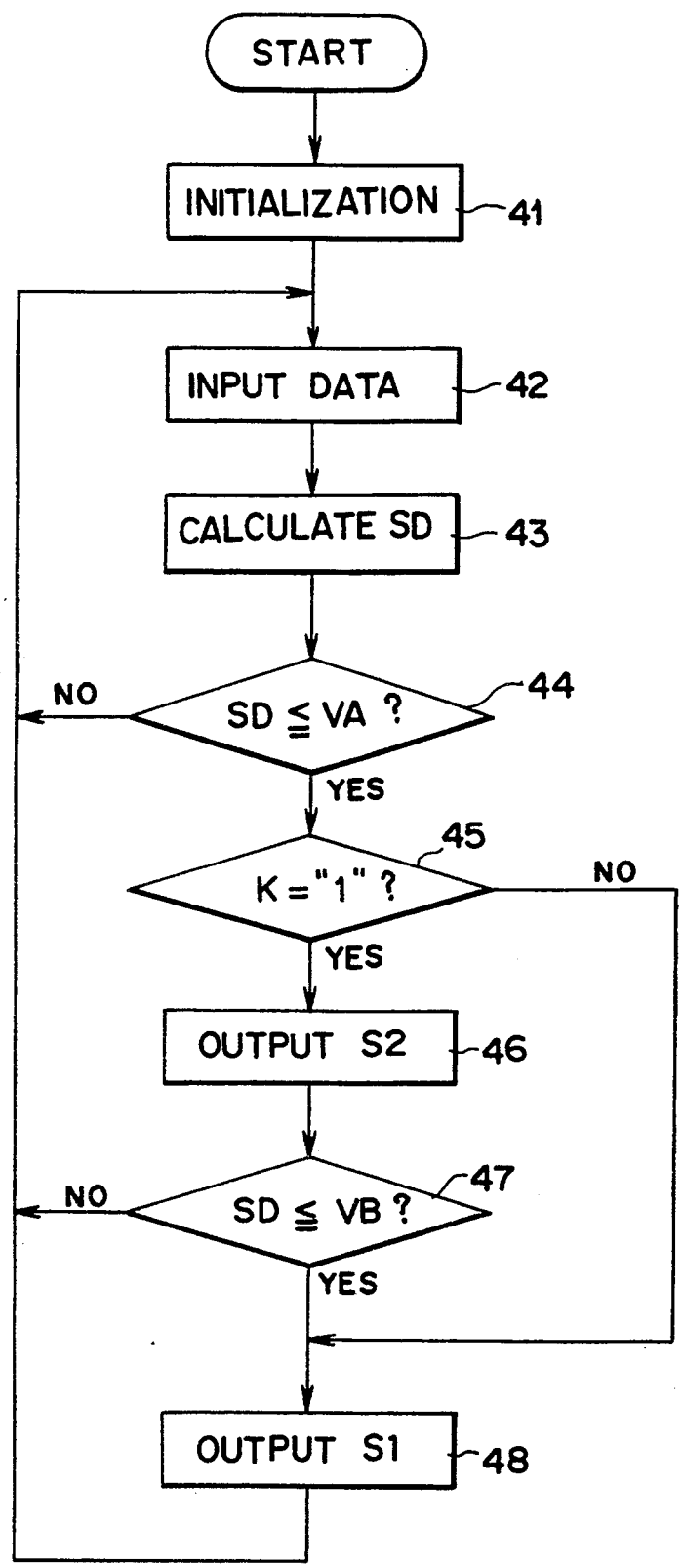
FIG. 4 is a flowchart showing the steps of a control program executed by the microcomputer shown in FIG. 3.

FIG. 4 is a flowchart showing the steps of a control program that is stored in the ROM 22a for execution by the microcomputer 22. When program execution is started, in Step 41 initialization takes place, and is followed in Step 42 by the input of data, which is stored in the RAM 22b (FIG. 3). In Step 43 the data is subjected to integration processing in accordance with acceleration signals Sa from the acceleration sensor 2. The processing that takes place in Step 43 is the same as that performed by the integrating unit 3 shown in FIG. 1, and in this case is used to calculate integration value data SD. In Step 44 it is determined whether or not integration value data SD, which corresponds to the integration output signal Sd of FIG. 1, is equal to, or lower than, first reference value data VA, which corresponds to voltage V1. When SD>VA, the outcome of Step 44 is No and program execution reverts to Step 42. When SD≦VA, the outcome of Step 44 is Yes, and program execution moves to Step 45.

In Step 45 it is determined whether or not detection signal K is high, signifying "1". When K=1 the outcome of Step 45 is Yes, and program execution moves to Step 46 in which a second control signal S2 is output to activate the preloader device Y. The second control signal S2 is input to the preloader driving circuit 10' constituted by a transistor 10a. In response to the second control signal S2 the transistor 10a switches on, whereby preloader ignition current IP flows through the ignition squib 12 and the preloader device Y activates.

In Step 47 it is determined whether or not integration value data SD is equal to, or lower than, a second reference value data VB, which corresponds to voltage V2. When SD>VB the outcome of Step 47 is No and program execution reverts to Step 42. When SD≦VB, the outcome of Step 47 is Yes and program execution moves to Step 48. In Step 48 a first control signal S1 is output to activate the air bag device X. The first control signal S1 is input to the air bag driving circuit 13' constituted by a transistor 13a. In response to the first control signal S1 the transistor 13a switches on, whereby air bag ignition current IA flows through the ignition squib 14 and the air bag device X activates. Upon completion of Step 48 program execution returns to Step 42. A seatbelt that is not buckled will produce a No outcome to Step 45, and program execution will skip 46 and 47 to proceed directly to Step 48, whereby only air bag device X is activated.

The execution of the control program of FIG. 4 by the microcomputer 22 shown in FIG. 3, as in the case of the arrangement shown in FIG. 1, enables the activation timing of the air bag device X and preloader device Y to be optimized according to whether the seatbelt is buckled or not.

In accordance with the present invention as described above, when at least two vehicle safety devices are used in conjunction, the second safety device is always activated in accordance with a timing that is optimized according to whether the first safety device is being used or not. This is accomplished without needing a complex arrangement, making this control apparatus a highly effective, low-cost way of ensuring passenger safety.

What is claimed is:

1. A vehicle safety device control apparatus comprising means for activating a preloader safety device at a first timing when a vehicle collision is detected, means for activating an air bag safety device at a second timing following said first timing, detecting means for detecting whether or not a seatbelt is buckled, and signal output means that, when a vehicle collision is detected and the detecting means detects that the seatbelt is not buckled, outputs a timing signal for activating the air bag safety device at a timing earlier than said second timing.

2. A control apparatus according to claim 1 further comprising an integrating means for outputting a voltage signal indicating the changing status of vehicle speed when the vehicle is in a collision.

3. A control apparatus according to claim 1 further comprising sensor means for detecting vehicle acceleration, and integrating means for carrying out integration processing of output from the sensor means for vehicle collision detection; wherein said signal output means comprises determining means comprising first discriminating means for discriminating between whether or not a level of an output from the integrating means has reached a prescribed first reference level, second discriminating means for discriminating between whether or not an output level from the integrating means has reached a prescribed second reference level wherein the time required to reach the prescribed second reference level is longer than the time required to reach the prescribed first reference level, and selecting means which sets an activation timing for the vehicle safety devices that is based on an output of the first discriminating means when the detecting means detects that the seatbelt is not buckled and which sets an activation timing for the vehicle safety devices that is based on an output of the second discriminating means when the detecting means detects that the seatbelt is buckled.

4. A control apparatus according to claim 3, in which, in response to the detecting means, the selecting means selects either the output from the first discriminating means or the output from the second discriminating means and applies the output to the signal output means as the output of the determining means.

5. A control apparatus according to claim 3, wherein said signal output means further comprises means for activating the preloader safety device at the time required by the first discriminating means.

6. A control apparatus according to claim 1 further comprising sensor means for detecting vehicle acceleration, and integrating means for carrying out integration processing of output from the sensor means for vehicle collision detection; wherein said signal output means comprises determining means for determining activation timing for the vehicle safety devices in response to whether or not the seatbelt is buckled by discriminating between whether or not a level of an output from the integrating means has attained a prescribed level established in accordance with an output from the detecting means indicating whether or not the seatbelt is buckled; and wherein the signal output means supplies an ignition current to an ignition element of each of the vehicle safety devices in response to an output from the determining means.

7. An control apparatus according to claim 1, wherein said earlier timing is said first timing.

* * * * *